(12) United States Patent
Jalali et al.

(10) Patent No.: US 10,003,915 B2
(45) Date of Patent: Jun. 19, 2018

(54) FRAME TIME SYNCHRONIZATION IN A WIRELESS LOCAL AREA NETWORK

(71) Applicant: Bridgewest Finance LLC, San Diego, CA (US)

(72) Inventors: Ahmad Jalali, Rancho Santa Fe, CA (US); Dhinakar Randakrishnan, San Diego, CA (US); Mehran Baghaei, San Diego, CA (US)

(73) Assignee: Bridgewest Finance LLC, San Diego, CA (US)

( * ) Notice: Subject to any disclaimer, the term of this patent is extended or adjusted under 35 U.S.C. 154(b) by 0 days. days.

(21) Appl. No.: 14/753,469

(22) Filed: Jun. 29, 2015

(65) Prior Publication Data

US 2015/0304810 A1    Oct. 22, 2015

Related U.S. Application Data

(63) Continuation-in-part of application No. 14/284,384, filed on May 21, 2014, now Pat. No. 9,784,816.

(60) Provisional application No. 61/944,115, filed on Feb. 25, 2014.

(51) Int. Cl.
| | |
|---|---|
| *H04W 4/02* | (2018.01) |
| *H04W 56/00* | (2009.01) |
| *H04W 84/12* | (2009.01) |
| *G06K 7/10* | (2006.01) |
| *G01S 5/14* | (2006.01) |

(52) U.S. Cl.
CPC ............ *H04W 4/02* (2013.01); *G01S 5/14* (2013.01); *G06K 7/10009* (2013.01); *H04W 56/001* (2013.01); *H04W 84/12* (2013.01); *Y02D 70/00* (2018.01); *Y02D 70/142* (2018.01); *Y02D 70/144* (2018.01)

(58) Field of Classification Search
CPC ...... H04W 4/02; H04W 56/001; H04W 84/12
See application file for complete search history.

(56) References Cited

U.S. PATENT DOCUMENTS

| | | | |
|---|---|---|---|
| 9,100,937 B2 * | 8/2015 | Seok | H04W 48/16 |
| 2002/0025810 A1 * | 2/2002 | Takayama | H04W 48/20 |
| | | | 455/432.1 |
| 2005/0068934 A1 * | 3/2005 | Sakoda | H04W 48/08 |
| | | | 370/350 |

* cited by examiner

*Primary Examiner* — Ayaz Sheikh
*Assistant Examiner* — Debebe Asefa
(74) *Attorney, Agent, or Firm* — Klein, O'Neill & Singh, LLP

(57) ABSTRACT

A position location system based on a wireless local area network such as an IEEE 802.11 network is described. The system determines position of mobile tags attached to assets or people. IEEE 802.11 enabled zone tags are installed to assist in positioning. The system aligns frame timing of zone tags to that of an associated basic service set (BSS). The system computes the frame timing offsets between adjacent BSSs, and utilizes the frame timing offsets in scheduling range measurements between zone tags and mobile tags. A set of zone tags which are in close proximity of a first zone tag and able to receive signals from the first zone tag is identified. Frame timing of all zone tags in a network are aligned.

20 Claims, 8 Drawing Sheets

FRAME TIME SYNCHRONIZATION IN A WIRELESS LOCAL AREA NETWORK

CROSS-REFERENCE TO RELATED APPLICATIONS

This application is a continuation-in-part of U.S. patent application Ser. No. 14/284,384, filed on May 21, 2014. U.S. patent application Ser. No. 14/284,384 claims priority to U.S. Provisional Patent Application Ser. No. 61/944,115, filed on Feb. 25, 2014.

BACKGROUND

The invention generally relates to location and tracking and more specifically to tracking position of assets using multiple local area networks.

A number of systems have been developed and deployed to locate and track the position of people and assets (collectively, "assets") within local area environments such as office buildings, hospitals, shopping malls, and hotels, and/or industrial environments such as refineries, oil rigs, and manufacturing facilities. Existing systems are limited to accuracy of a few meters using an existing Wi-Fi or Bluetooth network. In addition, existing systems attempt to determine absolute position and are not able to determine proximity (e.g., two or more assets within a threshold distance from each other).

In order to save power, various system elements, such as zone tags and mobile tags, may go into sleep mode, and thus need to wake up at certain time instants specified by a server in order to determine position using the tags.

Therefore, there is a need for a way to synchronize the frame timing of zone tags and the mobile tags so that they may wake up at the time instants scheduled by a server.

SUMMARY

Devices which use IEEE 802.11 WLAN technology (also referred to as wireless fidelity or "Wi-Fi" devices) may be utilized by some embodiments to determine position of some such devices.

Many applications requiring high position location precision involve establishing close association of two assets (e.g. two persons, a person and some equipment or two pieces of equipment). In many cases, it is not necessary that the precise location of a person or object (i.e. asset) be known, but rather the association of the two is needed which requires determining that an asset is in the proximity of another asset. For instance, hospitals would like to record if a doctor or a nurse has visited a certain patient during the day. In this application, what is important is to record that the doctor/nurse was in proximity of the patient at certain time. The position location accuracy requirement for this case is often referred to as "room level" accuracy meaning that the doctor/nurse must be located in the right room. However, if the objective is to ensure that the doctor/nurse visited the patient during the day, then it is really detecting the close proximity of the doctor/nurse and the particular patient that is needed and not necessarily accurately locating the doctor/nurse. In rooms with multiple beds, the doctor/nurse must be associated with the right patient in that room. Another example of room level accuracy is in hotels where it is desirable to locate a maid in the right room in case there is an emergency, or to be able to verify that someone has cleaned a specific room.

One manufacturing use case is to adjust the torque of a wrench depending on the specific manufacturing part the tool is trying to fasten. This again is a case of detecting proximity of the tool and a manufacturing part. Another example of the need to detect proximity is to ensure that certain medical equipment such as an intravenous (IV) pump is in fact attached to a certain patient. Another example is to register that doctors/nurses have washed their hands prior to certain functions such as visiting a patient. This application again requires detection of close proximity of the doctor/nurse and a sink/disinfectant station.

Another application for accurate position location in retail environment is to direct the customer to the right location in the store for a given item. Here one would want a very accurate positioning scheme to navigate the customer through the store so that the customer gets very close to the item he/she is searching.

Some embodiments provide ways to synchronize timing among various system components such that the components may be active at times when position data is requested. Some embodiments may synchronize frame timing offsets among components. A timestamp of a reference component may be used to align other components associated with the reference component. Likewise, timestamps may be shared among various components such that the frame timing offsets may be synchronized. Alternatively, any measured offsets may be reported to a remote server or other appropriate system resource.

The preceding Summary is intended to serve as a brief introduction to various features of some exemplary embodiments. Other embodiments may be implemented in other specific forms without departing from the spirit of the disclosure.

BRIEF DESCRIPTION OF THE SEVERAL VIEWS OF THE DRAWINGS

The novel features of the disclosure are set forth in the appended claims. However, for purpose of explanation, several embodiments are illustrated in the following drawings.

DETAILED DESCRIPTION

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various inventive features are described below that can each be used independently of one another or in combination with other features. Broadly, some embodiments generally provide ways to align frame timing of various system elements such that position location information can be determined by waking the various devices at appropriate times.

While the present invention is described with respect to use in Wi-Fi networks and access points therein, a person of ordinary skill in the art will readily recognize other types of networks and other applications may be used without departing from the scope of the disclosure.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. The upper and lower limits of these smaller ranges may independently be included in the smaller ranges also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by a person of ordinary skill in the art to which this invention belongs. Although any methods and materials similar or equivalent to those described herein can also be used in the practice or testing of the present invention, a limited number of the exemplary methods and materials are described herein.

As used herein and in the appended claims, the singular forms "a", "an", and "the" include plural referents unless the context clearly dictates otherwise.

The indoor position location system described in this disclosure may use IEEE 802.11 compliant wireless local area network (WLAN) technology to provide high precision indoor position location information for tags installed on assets as well as for user devices such as smartphones or tablets that may be carried by (and/or otherwise associated with) people. Although many examples throughout the disclosure may describe IEEE 802.11 based features, other embodiments may be implemented using various other appropriate protocols.

The indoor position location system complements an existing IEEE 802.11 WLAN network to provide high precision indoor position location information for mobile tags installed on assets as well as for user devices (e.g., smartphones carried by people).

Figure 1:
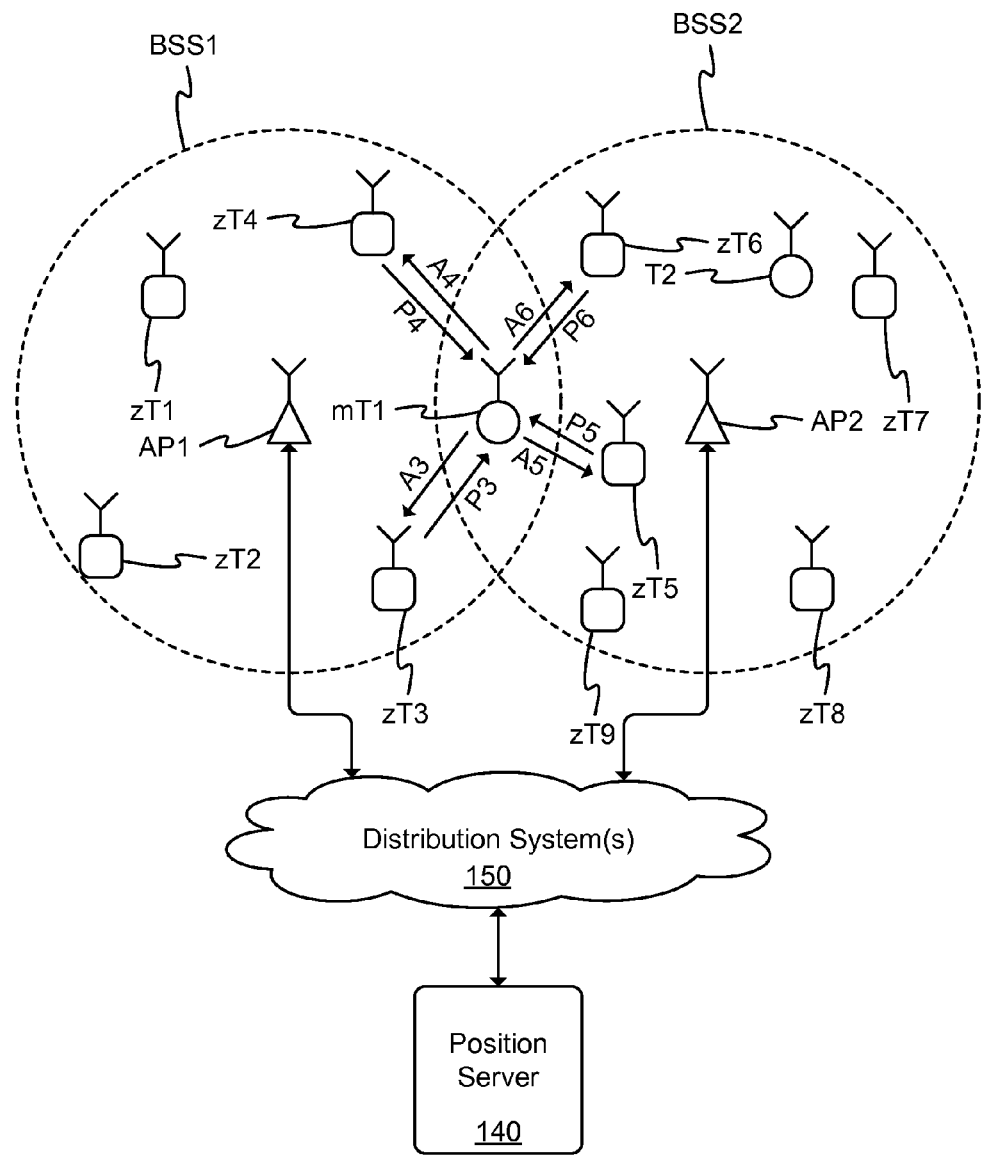
FIG. 1 illustrates a schematic block diagram of an exemplary IEEE 802.11 based position location system that uses zone tags.

FIG. 1 illustrates a schematic block diagram of an exemplary IEEE 802.11 based position location system that uses zone tags. FIG. 1 shows a typical IEEE 802.11 network deployment.

As shown, this example system includes access points (APs) AP1 and AP2. Each AP forms an associated basic service set (BSS) BSS1 and BSS2, respectively. Each BSS is identified by a unique BSSID. The BSSs may be interconnected to form an extended service set (ESS), and share the same security credentials thereby facilitating easy movement of Wi-Fi devices among different BSSs.

In the example of FIG. 1, there are two BSSs BSS1 and BSS2, and each of the BSSs has one AP AP1 and AP2, respectively. Different embodiments may include different numbers of BSSs (e.g., three, four, etc.). The BSSs can optionally be linked to form an ESS. The different BSSs, such as adjacent BSSs, may operate on different frequency channels to minimize interference between BSSs.

APs may be network Wi-Fi elements that are part of existing infrastructure associated with a given building or campus. Such Wi-Fi elements may be deployed in order to provide Internet access. Zone tags ZT1-ZT9 may be IEEE 802.11 capable devices which are physically mounted at various locations within a venue (e.g., walls, ceilings, etc.). Each zone tag may be associated with a "zone" of the venue. The zone tags may have similar capability as APs, and may also be included in a network to provide range measurements associated with mobile tags in order to determine the positions of the mobile tags. Zone tags may be used to complement the APs in legacy Wi-Fi networks associated with a given venue. Zone tags may provide the same functionality as the APs (or IEEE 802.11 stations), but may typically be used to provide range measurements associated with mobile tags. For venues where there is no existing Wi-Fi, network zone tags may be able to act as APs.

Mobile tags mT1-mT2 may be IEEE 802.11 enabled devices installed on assets and/or carried by people, and may be capable of communicating with the APs and/or zone tags.

APs and/or zone tags may be used to make range measurements in order to determine position. Zone tags may provide additional measurement capability compared to a network limited to APs, as in many existing 802.11 WLAN networks. Throughout the disclosure, the term "zone tag" may be used to refer to APs and auxiliary devices (i.e., any device with which tags and/or mobile devices may make range measurements for the purpose of position determination). "Tag" may refer to a device attached to an asset or an IEEE 802.11 enabled phone carried by a person.

Position location of a tag may be determined in various appropriate ways. The position location server 140 may schedule round trip delay (RTD) and/or time of arrival (TOA) measurements between mobile tags and multiple zone tags and perform triangulation using the measured RTD and/or TOA values in order to determine the position of a mobile tag. The computed position may be sent to (and/or otherwise made available to) other network elements. The distribution system 150 may include various network elements, interfaces, and/or devices, as appropriate.

In order to save power, the zone tags and mobile tags may enter a sleep mode, and wake up at certain time instants specified by the position server such that RTD and/or TOA measurements may be made. The frame timing of the zone tags and the mobile tags may be synchronized such that the tags wake up or enter active mode at the time scheduled by the position location server.

The following description details a technique for synchronizing frame timing of different network elements of the position location system described above to a common time source. In an IEEE 802.11 network, devices use the timestamp in the beacon frame, or probe response messages sent by APs, to synchronize timing to that of the AP using the timing synchronization function (TSF). Such a TSF may be used to synchronize the zone tags of the disclosed position location system, and extend the TSF to provide a common time source across different BSSs.

All zone tags and/or mobile tags that are within a BSS may extract the timing information sent by the beacon frame of the AP of the BSS and synchronize frame timing to that of the AP. In the example of FIG. 1, where there are multiple BSSs, there is no common time reference across all BSSs. In a network with multiple BSSs, a mobile tag may be assigned to do RTD and/or TOA measurements with zone tags registered on different BSSs (e.g., mT1 may perform RTD and/or TOA measurements with zT3 and zT4 on BSS1 and with zT5 and zT6 on BSS2). Devices zT3, zT4 and mT1 are all in BSS1, and thereby synchronized by AP1, and may use the frame timing of AP1 as a common time source. Tags zT5 and zT6 are on BSS2, and are thereby synchronized to the frame timing of AP2.

When zone tags are deployed and are powered on for the first time, the tags will go through a BSS discovery phase. In this phase, zone tags will scan known frequency channels, and identify a list of APs from which the tags are able to receive beacon frames (referred to as the "zone-tag-detected-AP-list"). Each zone tag associates with the AP in the zone-tag-detected-AP-list from which the tag receives the strongest signal. The APs may be operating on different frequency channels. Therefore, the zone tags and mobile tags must scan all known frequency channels in order to find all available APs. The zone-tag-detected-AP-list may include the BSSID and the frequency channel of the AP as well as other appropriate information.

Zone tags may listen to beacon frames of the APs of the zone-tag-detected-AP-list on the appropriate frequency channels, and read the timestamp of the beacon frames. Because APs only periodically send Beacon frames, the zone tags may alternatively send a probe request message to the APs of the zone-tag-detected-AP-list, requesting the timestamps of the APs. The APs may, upon receiving the probe request message, send back probe response messages with the timestamp information. Upon receiving the timestamps of the APs in the zone-tag-detected-AP-list, the zone tag may compute the offset between the frame timing of the AP with which the zone tag is associated and the frame timings of the other APs in the zone-tag-detected-AP-list.

Next, each zone tag may report the offset between the frame timing of the primary AP and the neighboring APs to the position location server. The position location server may use the frame timing offset between the BSS associated with a mobile Tag and the frame timing of a neighboring BSS when scheduling RTD and/or TOA measurements between the mobile tags and the zone tags which are on different BSSs. Therefore, in this scheme the frame timing of zone tags on different BSSs are not directly synchronized. Instead, the offset between the frame timing of zone tags that are on different APs/BSSs are reported to the position location server. The position location server may take into account the frame timing offset between zone tags on adjacent BSSs in scheduling wake up times for zone tags on adjacent BSSs so that zone tags wake up at the desired time instants.

For example, when zT4 and zT6 are deployed and powered on, each will scan the medium in order to find the closest AP with which to associate. Tag zT4 finds AP1 to be the closest, and zT6 finds AP2 to be the closest. Tag zT4 may associate with AP1, and zT6 associates with AP2. After association with an AP, a zone tag may read the timestamp in the beacon frame of the corresponding AP, thereby synchronizing to the AP's frame timing. In this example, during scanning, zT4 is able to see AP2, and zT6 is able to see AP1. Tag zT4 may send a probe request message to AP2 requesting information such as a timestamp. AP2 may respond by sending a probe response message including the timestamp. After receiving the probe response message, zT4 may calculate the frame timing offset between AP1 and AP2. Similarly, zT6 may calculate the frame timing offset between AP2 and AP1. Each zone tag may send the calculated frame timing offset value between the two APs to the location server 140. Mobile tag mT1 may make range measurements with zone tags zT3 and zT4 on AP1, and zT5 and zT6 on AP2. Mobile Tag mT1 is associated with AP1 in this example. Then, the position location server 140 may take into account the frame timing offset between AP1 and AP2 as reported by zT4 and zT6 to schedule range measurements between mT1 and zT3, zT4, zT5 and zT6.

Zone tags and mobile tags may send their timestamps to other zone tags or to mobile tags for synchronizing their frame timing in the network. In order for a zone tag to propagate frame timing to other zone tags, a first zone tag may send an advertisement message that includes the timestamp of the zone tag. Zone tags that receive the advertisement message may read the timestamp and align their timing to that of the timestamp. A first zone tag may need to search for advertisement messages sent by other zone tags in the first zone tag's coverage area. Therefore, each zone tag needs a list of zone tags which are in the zone tag's coverage area.

Different embodiments may generate the list of zone tags in various different ways. In one example, zone tags may make signal strength measurements, such as received signal strength (RSS) with each AP in the zone-tag-detected-AP-list. Zone tags may also make RTD and/or TOA measurements with each AP in the zone-tag-detected-AP-list. Each zone tag may send the RSS, RTD, and/or TOA measurements to the position location server. The position location server may make an estimate of the position location of each zone tag using information such as the zone tag's RSS and/or RTD and/or TOA values from the zone tags to an AP. Based on a first zone tag's approximate position location, the position location server may create a zone-tag-neighbor-list which includes other zone Tags that are close to the first zone tag. In some embodiments, zone tags may search for advertisement frames sent by zone tags in the zone-tag-neighbor-list in order to propagate common frame timing throughout the network.

Another example way to create a list of zone tags that are in the coverage area of (or close to) a first zone tag is described next. Once each zone tag is associated with an AP, the discovery phase may begin where the zone tags discover other zone tags in their coverage area. In this phase, a first zone tag may send a discovery message identifying the zone tag. Other zone tags which can detect the discovery message sent by the first zone tag add the first zone tag's identity to a list referred to as the discovered-zone-tag-list. The discovery process continues until all zone tags have sent at least one discovery message. Once zone tags do not receive any new discovery messages after a certain time period, the zone tags forward their discovered-zone-tag-list to the position location server. Once the position location server determines that all zone tags have sent a discovery message at least once, the server then informs the zone tags that the discovery phase has been completed. Note that the mobile tags may similarly create their own discovered-zone-tag-list.

Figure 2:
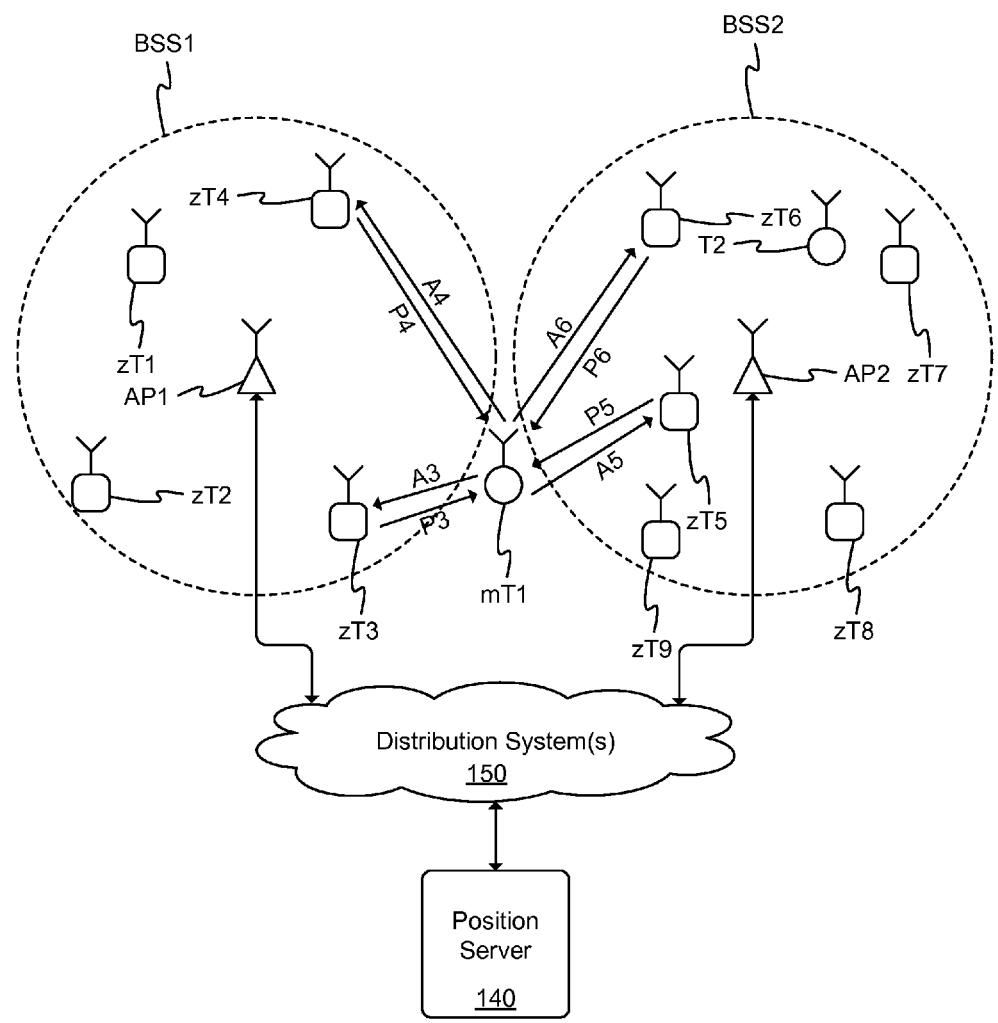
FIG. 2 illustrates a schematic block diagram of an exemplary IEEE 802.11 based position location system that uses a mobile tag to make ranging measurements with multiple zone tags across multiple base service sets (BSSs)

FIG. 2 illustrates a schematic block diagram of an exemplary IEEE 802.11 based position location system that uses a mobile tag to make ranging measurements with multiple zone tags across multiple BSSs. In this example, a mobile tag mT1 is located in between BSS1 and BSS2, and the location server 140 has assigned zone tags, zT3, zT4, zT5 and zT6 to mobile tag mT1. Although mobile tag mT1 can hear zone tags zT3, zT4, zT5 and zT6, zone tags zT3 and zT4 cannot detect signals from zone tags zT5, zT6, or AP2. Therefore, the zone tags in the neighboring BSSs BSS1 and BSS2 cannot, due to lack of connectivity between zone tags on BSS1 and BSS2, determine the offset timing difference between BSS1 and BSS2.

In this case, because mobile tag mT1 can communicate with at least one zone tag in BSS1 and at least one zone tag in BSS2, mT1 may search for advertisement messages from zone tags in the discovered-zone-tag-list and read the zone tag's timestamp. Mobile tag mT1 may compute the frame timing offset between BSS1 and BSS2 and send the result to the position location server 140.

Figure 3:
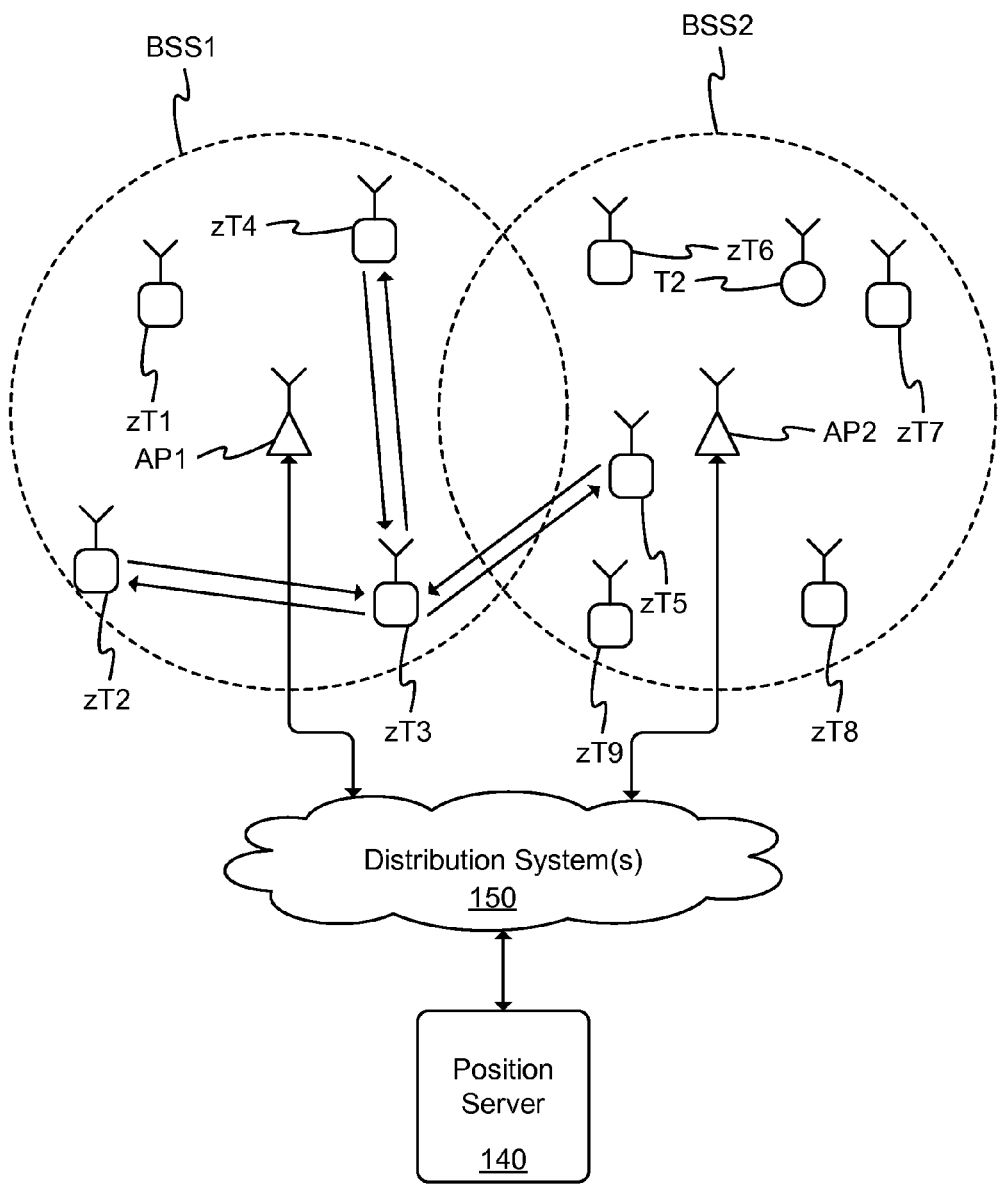
FIG. 3 illustrates a schematic block diagram of an exemplary IEEE 802.11 based position location system where zone tags associated with a first BSS are able to communicate with zone tags associated with a second BSS.

FIG. 3 illustrates a schematic block diagram of an exemplary IEEE 802.11 based position location system where zone tags associated with a first BSS are able to communicate with zone tags associated with a second BSS. In this example, the frame timing of all zone tags across the network may be synchronized to a reference BSS.

The location server 140 may choose one of the available BSSs as the reference BSS, and designate all zone tags in that BSS as reference zone tags. In the example of FIG. 3, BSS1 is designated as the reference BSS and zone Tags zT1, zT2, zT3, and zT4 are thus designated as reference zone tags. When a first zone tag in one BSS communicates with a second zone tag in a neighboring BSS, the first zone tag may propagate the reference BSS timestamp to the second zone tag.

Zone tags in the reference BSS align their frame timing to that of the timestamp received in the beacon frame from the AP of the corresponding BSS. In this example, zT3 sends an advertisement frame including the timestamp of zT3. Tag zT5, which has zT3 in its discovered-zone-tag-list, monitors the advertisement frame from zT3 and aligns its frame timing to that of the timestamp in the advertisement frame received from zT3.

Zone tag zT5, in turn, may send an advertisement frame which includes its timestamp. All zone tags which have zT5 in their discovered-zone-tag-list receive the advertisement frame sent by zT5, and align their frame timing to that of the timestamp sent in the advertisement frame by zT5.

Generalizing this process, each zone tag whose frame timing has been aligned, sends an advertisement frame with its timestamp; and each zone tag whose frame timing has not been aligned, searches for advertisement frames of zone tags in its discovered-zone-tag-list, and aligns its frame timing to that of the advertisement frame of a zone tag in the discovered-zone-tag-list. Each zone tag informs the position location server 140 once it has aligned its frame timing. This process continues until all zone tags have received an advertisement frame from another zone tag, and have aligned their frame timing to that of the timestamp of the received advertisement frame.

Figure 4:
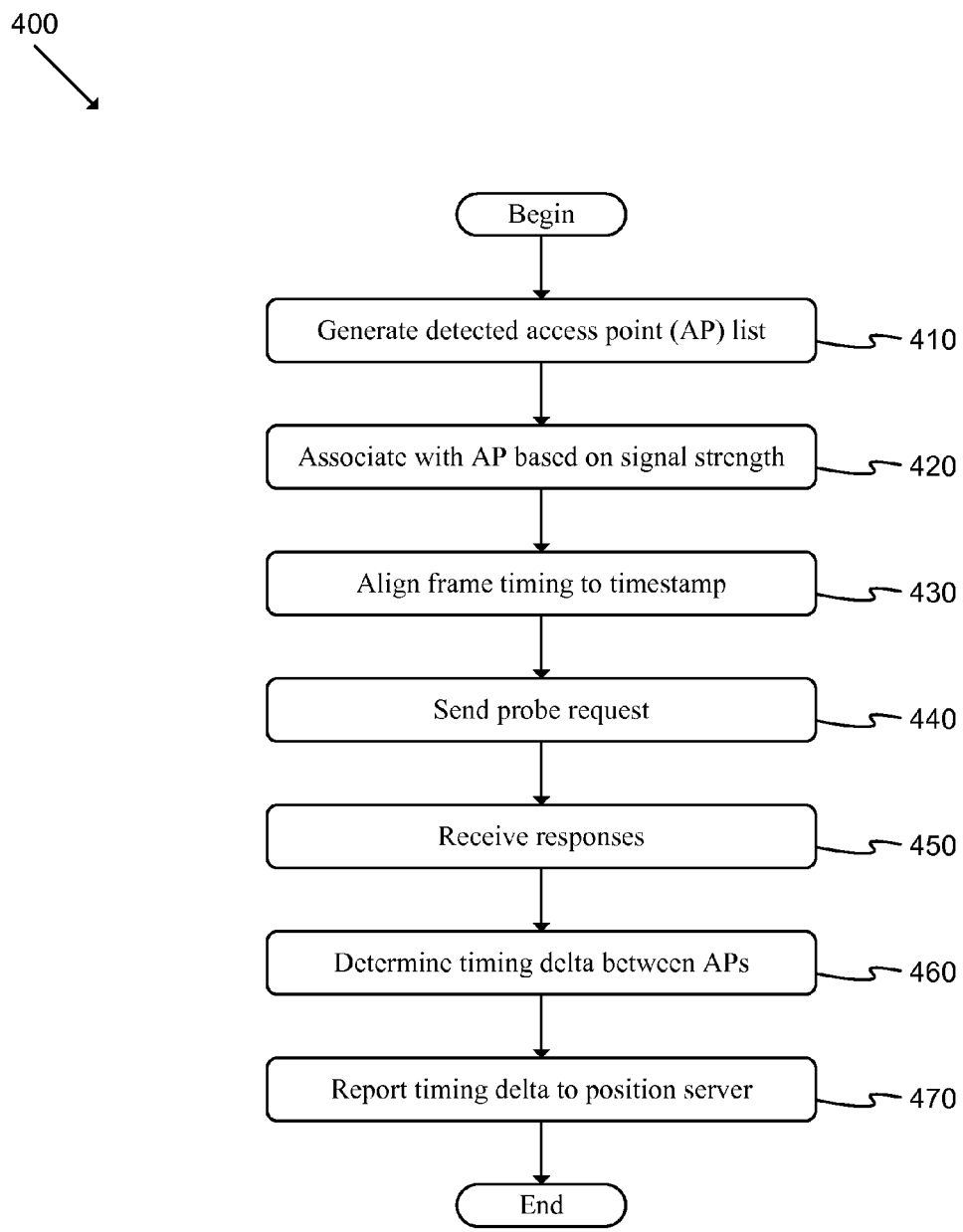
FIG. 4 illustrates a flow chart of an exemplary process that uses zone tags to determine frame timing offsets between APs with signals that are detectable by the zone tag.

FIG. 4 illustrates a flow chart of an exemplary process 400 that uses zone tags to determine frame timing offsets between APs with signals that are detectable by the zone tag. Such a process may be performed by a zone tag of some embodiments.

As shown, the process searches for beacon frames from APs in the network, lists the detected APs along with the received signal strength from each AP, and generates (at 410) a zone-tag-detected-AP-list. Next, the process may associate (at 420) with the AP from which it receives the strongest signal.

The process may then read the timestamp field from the transmitted beacon frame of the AP, and align (at 430) frame timing to the timestamp. Next, the process may sequentially send (at 440) probe request messages to each AP in the zone-tag-detected-AP-list. Such messages may be sent on the frequency channel of the AP.

Next, the process may receive (at 450) a probe response message from each AP, and record the timestamp field of the probe response message. The process may then determine (at 460) the frame timing offset between the primary AP with which the zone tag is associated and that of each of the other APs on the zone-tag-detected-AP-list. The process may then report (at 470) the frame timing offset values to the position server and then may end.

In some embodiments, mobile tag to zone tag communication may be used to determine frame timing offset between different BSSs. In cases where the zone tags in one BSS cannot receive messages from an AP or zone tags of an adjacent BSS, a mobile tag that is in the coverage boundary of the two BSSs may be used to obtain the frame timing of zone tags of the two BSSs. Each mobile tag may have a list of zone tags whose signal it is able to detect. The zone tags may send advertisement messages that carry the zone tag timestamp. Mobile tags may scan zone tags in the list of zone tags, decode the advertisement message, and read its timestamp. The mobile tag may send the offset between the timestamps recovered from the advertisement messages of zone tags on different BSSs to the position location server.

Figure 5:
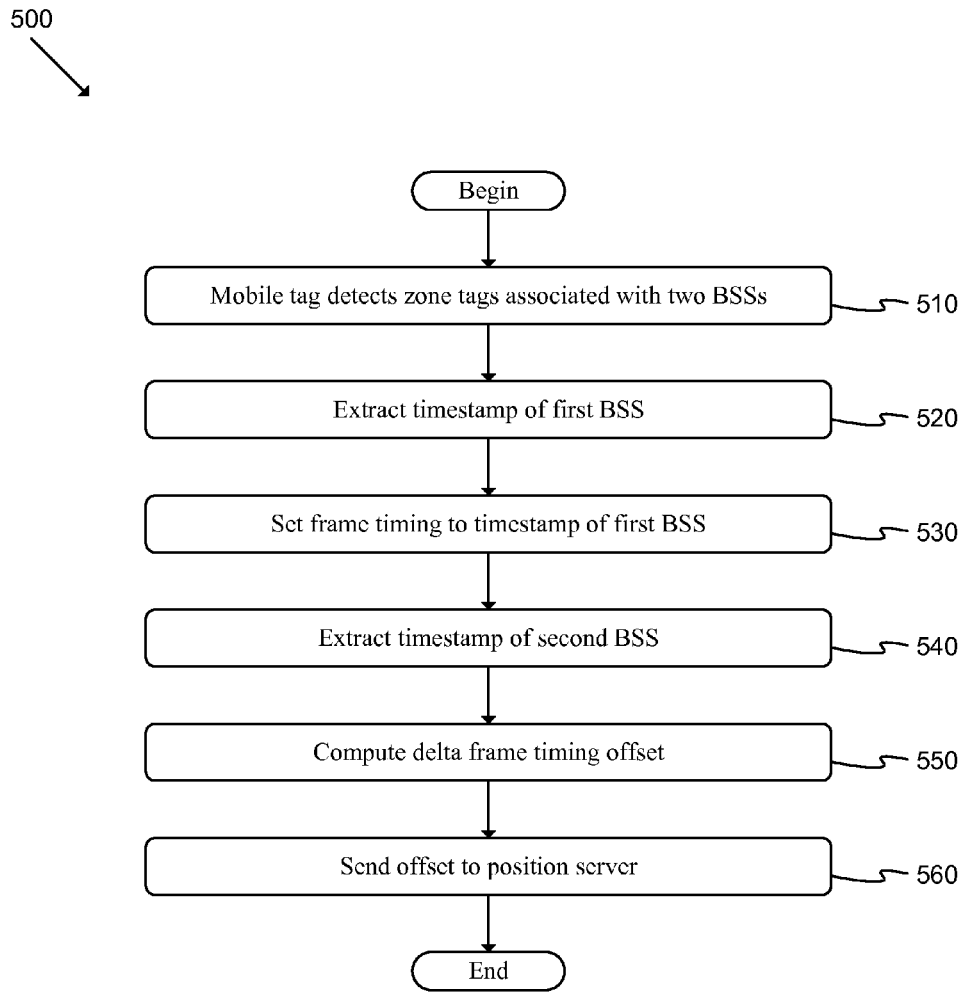
FIG. 5 illustrates a flow chart of an exemplary process used by some embodiments to determine the frame timing offset between two BSSs.

FIG. 5 illustrates a flow chart of an exemplary process 500 used by some embodiments to determine the frame timing offset between two BSSs. Such a process may be executed by a mobile tag or zone tag of some embodiments. In some cases, the mobile tag may be identified by the position location server based on the mobile tag being able to detect at least one zone tag in each of at least two BSSs.

As shown, the process may detect (at 510) zone tags associated with two BSSs. Next, the process may search for the advertisement message sent by the zone tag of a first BSS, and extract (at 520) the timestamp of the zone tag. The process may then set (at 530) the mobile tag frame timing to that of the timestamp received from the zone tag in the first BSS.

Next, the process may search for the advertisement message sent by a zone tag of a second BSS, and extract (at 540) the timestamp of the zone tag. The process may then compute (at 550) the frame timing offset between the timestamp received from the zone Tag in the second BSS and the frame timing of the mobile tag, send (at 560) the result to the position location server and then may end.

Figure 6:
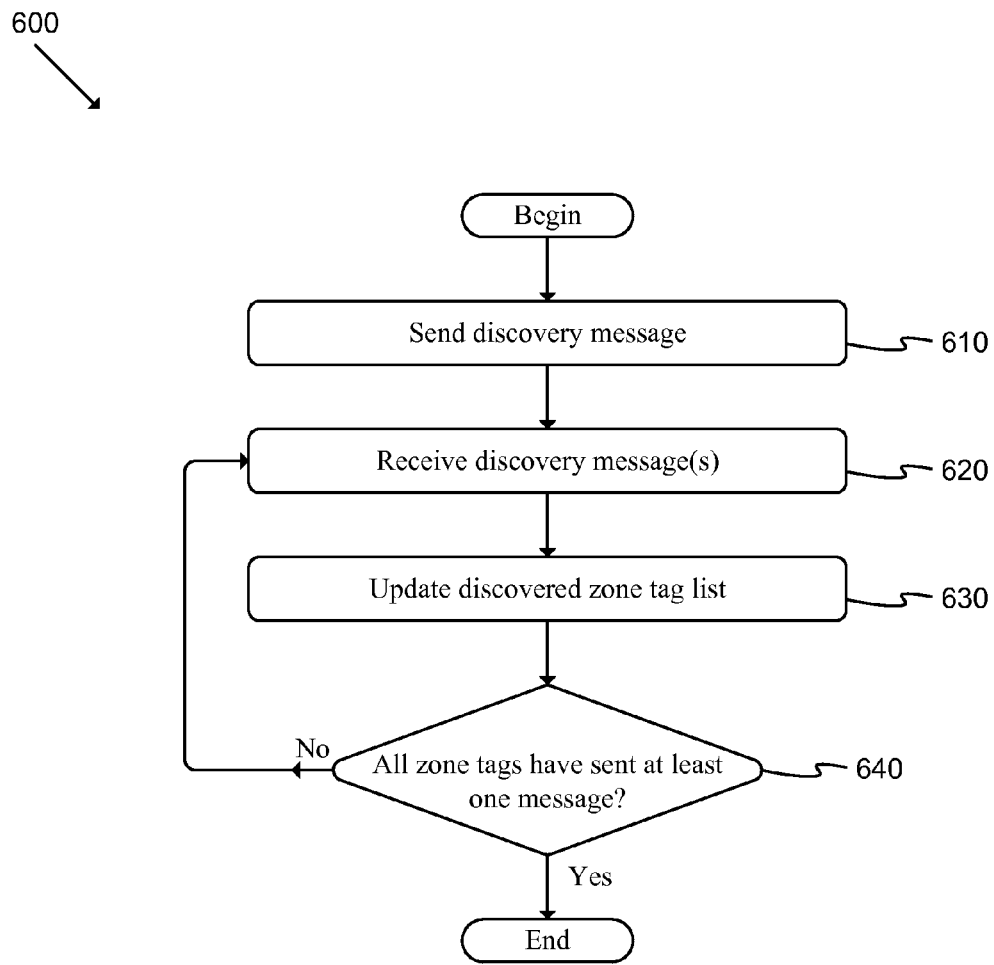
FIG. 6 illustrates a flow chart of an exemplary process 600 used by zone tags (and/or mobile tags) to create a discovered-zone-tag-list.

FIG. 6 illustrates a flow chart of an exemplary process 600 used by zone tags (and/or mobile tags) to create a discovered-zone-tag-list.

As shown, the process may send (at 610) discovery messages containing the sending zone tag identification. Next, the process may receive (at 620) discovery message(s) from other zone tags, update (at 630) the discovered-zone-tag-list to reflect the zone tag identity of the received discovery message and inform the position location server.

Next, the process may determine (at 640) whether all zone tags have sent at least one discovery message. If the process determines (at 640) that all zone tags have not sent at least one discovery message, the process may repeat operations 620-640 until the process determines (at 640) that all zone tags have sent at least one discovery message.

If the process determines (at 640) that all zone tags have sent at least one discovery message, the process may end. The position location server may inform the zone tags and/or mobile tags that the discovery phase has been completed.

In the embodiments described above, the frame timing of zone Tags in different BSSs were not directly synchronized. Instead, the frame timing offsets between different BSSs were determined, and used by the position location server to decide when each zone tag in the network must wake up so that all zone tags wake up according to the mobile tag and/or zone tag range measurement schedule. In the embodiments described below, zone tags across the network may directly synchronize their frame timing to the frame timing of a reference BSS.

Figure 7:
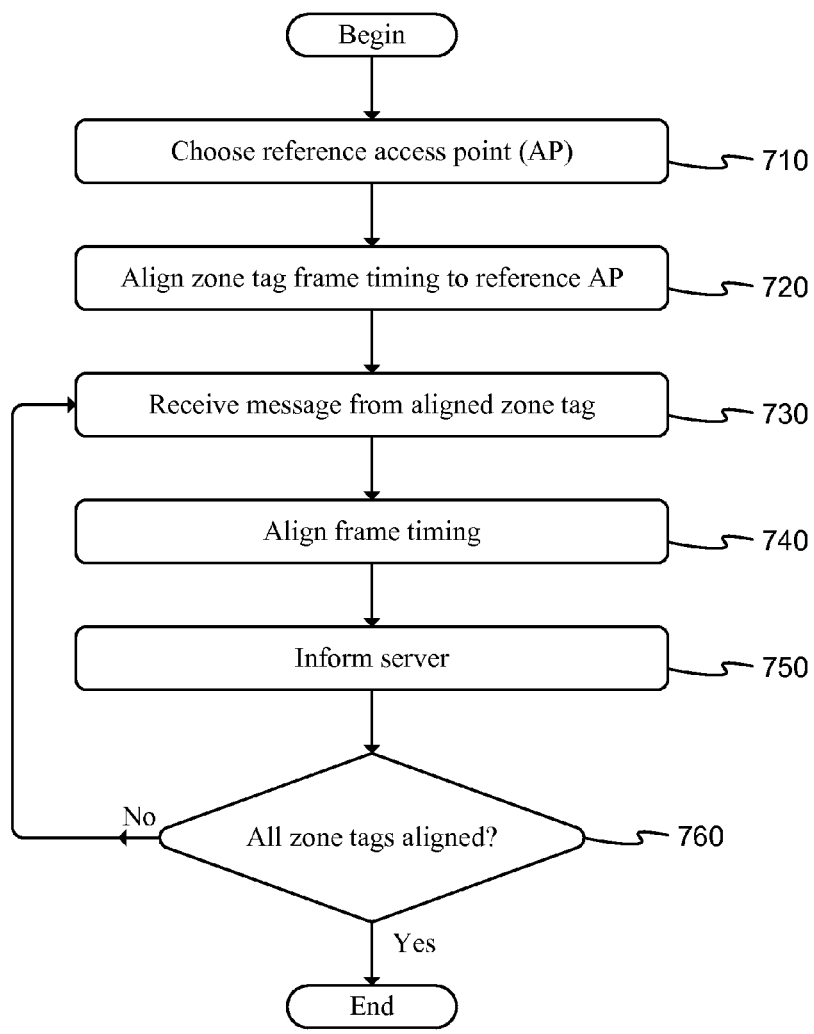
FIG. 7 illustrates a flow chart of an exemplary process used to align frame timing of all zone tags in a network to a reference AP.

FIG. 7 illustrates a flow chart of an exemplary process 700 used to align frame timing of all zone tags in a network to a reference AP. As shown, the process may choose (at 710) a reference AP (and associated BSS).

Next, all zone tags that are associated with the reference AP read the beacon frame sent by the AP and align (at 720) their frame timing to that of the reference AP. Each zone Tag whose frame timing has been aligned sends an advertisement message. Zone tags search for and receive (at 730) advertisement messages of zone tags in a pre-specified list, align (at 740) their timing to that of the received advertisement message timestamp, and inform (at 750) the position location server that timing has been aligned.

Next, the position location server may verify (at 760) whether all zone tags have aligned their frame timing. If not, the process may repeat operations 730-760 until the process verifies that all zone tags have aligned their frame timing and the process may then end.

Many of the processes and modules described above may be implemented as software processes that are specified as one or more sets of instructions recorded on a non-transitory storage medium. When these instructions are executed by one or more computational element(s) (e.g., microprocessors, microcontrollers, digital signal processors (DSPs), application-specific integrated circuits (ASICs), field programmable gate arrays (FPGAs), etc.) the instructions cause the computational element(s) to perform actions specified in the instructions.

In some embodiments, various processes and modules described above may be implemented completely using electronic circuitry that may include various sets of devices or elements (e.g., sensors, logic gates, analog to digital converters, digital to analog converters, comparators, etc.). Such circuitry may be able to perform functions and/or features that may be associated with various software elements described throughout.

Figure 8:
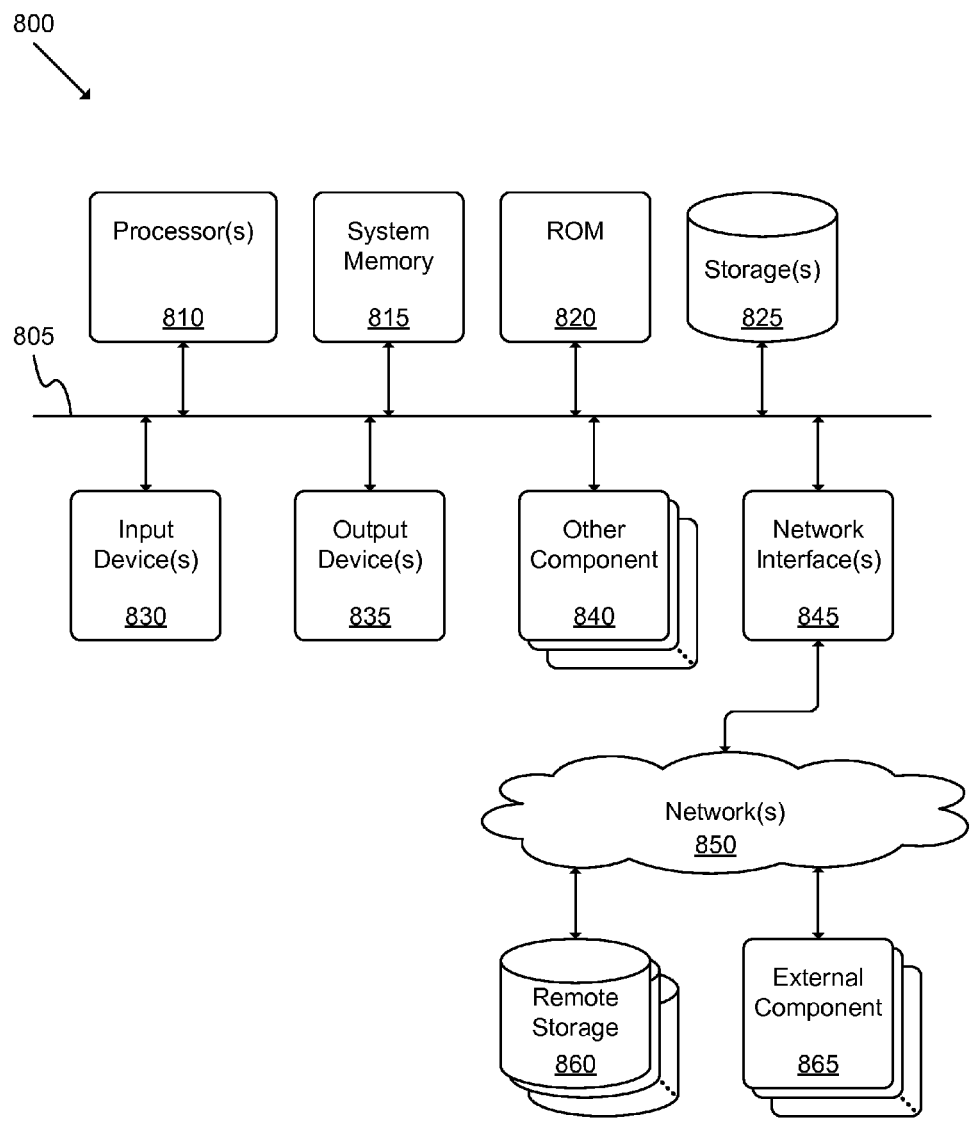
FIG. 8 illustrates a schematic block diagram of an exemplary computer system used to implement some embodiments.

FIG. 8 illustrates a schematic block diagram of an exemplary computer system 800 used to implement some embodiments. For example, the system described above in reference to FIGS. 1-3 may be at least partially implemented using computer system 800. As another example, the processes described in reference to FIGS. 4-7 may be at least partially implemented using sets of instructions that are executed using computer system 800.

Computer system 800 may be implemented using various appropriate devices. For instance, the computer system may be implemented using one or more personal computers (PCs), servers, mobile devices (e.g., a smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

As shown, computer system 800 may include at least one communication bus 805, one or more processors 810, a system memory 815, a read-only memory (ROM) 820, permanent storage devices 825, input devices 830, output devices 835, various other components 840 (e.g., a graphics processing unit), and one or more network interfaces 845.

Bus 805 represents all communication pathways among the elements of computer system 800. Such pathways may include wired, wireless, optical, and/or other appropriate communication pathways. For example, input devices 830 and/or output devices 835 may be coupled to the system 800 using a wireless connection protocol or system.

The processor 810 may, in order to execute the processes of some embodiments, retrieve instructions to execute and/or data to process from components such as system memory 815, ROM 820, and permanent storage device 825. Such instructions and data may be passed over bus 805.

System memory 815 may be a volatile read-and-write memory, such as a random access memory (RAM). The system memory may store some of the instructions and data that the processor uses at runtime. The sets of instructions and/or data used to implement some embodiments may be stored in the system memory 815, the permanent storage device 825, and/or the read-only memory 820. ROM 820 may store static data and instructions that may be used by processor 810 and/or other elements of the computer system.

Permanent storage device 825 may be a read-and-write memory device. The permanent storage device may be a non-volatile memory unit that stores instructions and data even when computer system 800 is off or unpowered. Computer system 800 may use a removable storage device and/or a remote storage device as the permanent storage device.

Input devices 830 may enable a user to communicate information to the computer system and/or manipulate various operations of the system. The input devices may include keyboards, cursor control devices, audio input devices and/or video input devices. Output devices 835 may include printers, displays, and/or audio devices. Some or all of the input and/or output devices may be wirelessly or optically connected to the computer system.

Other components 840 may perform various other functions. These functions may include performing specific functions (e.g., graphics processing, sound processing, etc.), providing storage, interfacing with external systems or components, etc.

Finally, as shown in FIG. 8, computer system 800 may be coupled to one or more networks 850 through one or more network interfaces 845. For example, computer system 800 may be coupled to a web server on the Internet such that a web browser executing on computer system 800 may interact with the web server as a user interacts with an interface that operates in the web browser. Computer system 800 may be able to access one or more remote storages 860 and one or more external components 865 through the network interface 845 and network 850. The network interface(s) 845 may include one or more application programming interfaces (APIs) that may allow the computer system 800 to access remote systems and/or storages and also may allow remote systems and/or storages to access computer system 800 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 800 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

The foregoing relates to illustrative details of exemplary embodiments and modifications may be made without departing from the spirit and scope of the disclosure as defined by the following claims.

We claim:

1. A position location determination system that performs frame timing synchronization, the system comprising:
   a set of IEEE 802.11 enabled access points (APs), wherein each AP forms a basic service set (BSS) and provides frame timing to devices associated with the BSS;
   a set of IEEE 802.11 enabled zone tags associated with the set of APs, wherein each zone tag makes range measurements with IEEE 802.11 enabled mobile tags, receives frame timing information from an associated AP, adjusts frame timing to match frame timing of the associated AP, and shares frame timing information with other zone tags, wherein each zone tag is a separate physical device mounted at a particular location; and
   a position location server that configures the zone tags and mobile tags, schedules range measurements between mobile tags and zone tags, and estimates position location of the mobile tags based at least partly on the range measurements.

2. The position location determination system of claim 1, wherein each zone tag further:
   scans a communications channel to detect beacon signals from the APs;
   associates with a primary AP identified as having a strongest signal quality; and
   creates a list of detected APs that excludes the primary AP.

3. The position location determination system of claim 2, wherein each zone tag receives a beacon frame from the associated AP, reads a timestamp field of the beacon frame, and aligns frame timing based at least partly on the timestamp.

4. The position location determination system of claim 3, wherein each zone tag further:
   sends a probe request message to each AP on the list of detected APs;
   receives a probe response message from the APs, reads the timestamp of the probe response message, and computes the frame timing offset between the zone tag frame timing and each AP; and
   sends the computed frame timing offsets to the position location server.

5. The position location determination system of claim 4, wherein the position location server uses the computed frame timing offsets to schedule range measurements between mobile tags and zone tags in different BSSs.

6. The position location determination system of claim 1, wherein:
   a first zone tag transmits a discovery message; and
   each zone tag and mobile tag within a coverage area of the first zone tag decodes the discovery message and adds an identification of the first zone tag to a discovered-zone-tag-list.

7. The position location determination system of claim 6, wherein:
   a BSS is designated as a reference BSS;
   each zone tag associated with the reference BSS aligns frame timing to a timestamp of a beacon frame of the AP associated with the reference BSS;
   each zone tag, after frame timing has been aligned, sends an advertisement message comprising a timestamp; and
   each zone tag whose frame timing has not been aligned, searches for advertisement messages of zone tags in the discovered-zone-tag-list, and aligns frame timing to that of the advertisement message.

8. The position location determination system of claim 7, wherein each mobile tag:
   reads the timestamp in the advertisement message sent by a zone tag of the reference BSS which is in the discovered-zone-tag-list;
   reads the timestamp in the advertisement message sent by a zone tag of a different BSS which is in the discovered-zone-tag-list;
   computes the offset between timestamps of the reference BSS and the different BSS and sends the result to the position location server.

9. The position location determination system of claim 1, wherein:
   mobile tags and zone tags make received signal strength and range measurements with each AP in a list of detected APs, and send the measurements to the position location server; and
   the position location server makes position location estimates of the mobile tags and zone tags.

10. The position location determination system of claim 9, wherein the position location server further:
    determines an approximate position location estimate of each mobile tag and zone tag;
    creates, for each mobile tag and zone tag, a zone-tag-neighbor-list which includes zone tags in proximity; and
    sends the zone-tag-neighbor-list to each mobile tag and zone tag.

11. The position location determination system of claim 10, wherein:
    a BSS is chosen as reference BSS;
    zone tags associated with the reference BSS align frame timing to a timestamp of a beacon frame of the AP associated with the reference BSS;
    each zone tag whose frame timing has been aligned sends an advertisement message comprising the timestamp; and
    each zone tag whose frame timing has not been aligned, searches for advertisement messages of zone tags in the zone-tag-neighbor-list, and aligns frame timing to that of the advertisement message.

12. The position location determination system of claim 11, wherein each mobile tag:
    reads the timestamp in the advertisement message sent by a zone tag of the reference BSS which is in the zone-tag-neighbor-list;

reads a timestamp in an advertisement message sent by a zone tag of a different BSS which is in the zone-tag-neighbor-list; and computes the offset between the timestamps of the reference BSS and the different BSS and sends the result to the position location server.

13. An automated method that determines frame timing offsets between access points (APs), the method comprising:

generating, at a zone tag, wherein the zone tag is a physical device mounted at a particular location, a list of detected APs;

associating the zone tag with a particular AP from the list of detected APs based at least partly on a signal strength associated with the particular AP;

reading, at the zone tag, a first timestamp received from the particular AP;

aligning frame timing of the zone tag based at least partly on the first timestamp;

sending a probe request to at least one other AP from the list of detected APs;

receiving a response to the probe request, the response including a second timestamp;

determining a timing offset between the particular AP and the at least one other AP based at least partly on the first and second timestamps; and reporting the timing offset to a position server.

14. The automated method of claim 13, wherein the zone tag and the APs are IEEE 802.11 enabled devices.

15. The automated method of claim 13, wherein the first and second timestamps are extracted from beacons received from the particular AP and the at least other AP.

16. The automated method of claim 13, wherein the sending, receiving, determining, and reporting are performed iteratively for each AP in the list of detected APs.

17. An automated method that determines the frame timing offset between two basic service sets (BSSs), the method comprising:

detecting, at a mobile tag, zone tags associated with at least two BSSs, wherein each zone tag is a physical device mounted at a particular location;

extracting, at the mobile tag, a first timestamp of a first BSS;

setting frame timing of the mobile tag using the first timestamp;

extracting, at the mobile tag, a second timestamp of a second BSS;

determining, at the mobile tag, a timing offset between the first and second BSS based at least partly on the first and second timestamps; and sending the timing offset to a position server.

18. The automated method of claim 17, wherein the mobile tag and zone tags are IEEE 802.11 enabled devices.

19. The automated method of claim 17, wherein detecting the zone tags comprises:

sending, from the mobile tag, a discovery message;

receiving, from each of a set of zone tags, a discovery response message; and adding the set of zone tags to a list of detected zone tags.

20. The automated method of claim 17, wherein the extracting, determining, and sending are performed iteratively for each BSS of the at least two BSSs.

* * * * *